United States Patent
Kakadjian et al.

(10) Patent No.: US 10,138,412 B2
(45) Date of Patent: Nov. 27, 2018

(54) HYDRAULIC FRACTURING COMPOSITIONS INCLUDING NOVEL VISCOSIFYING SYSTEMS AND METHODS FOR MAKING AND USING SAME

(71) Applicant: Keane Group Holdings, LLC, The Woodlands, TX (US)

(72) Inventors: Sarkis Kakadjian, The Woodlands, TX (US); Jarrett Kitchen, The Woodlands, TX (US)

(73) Assignee: KEANE GROUP HOLDINGS, LLC, Houston, TX (US)

( * ) Notice: Subject to any disclaimer, the term of this patent is extended or adjusted under 35 U.S.C. 154(b) by 0 days.

(21) Appl. No.: 15/665,899

(22) Filed: Aug. 1, 2017

(65) Prior Publication Data
US 2018/0119004 A1    May 3, 2018

Related U.S. Application Data

(60) Provisional application No. 62/369,284, filed on Aug. 1, 2016.

(51) Int. Cl.

| | |
|---|---|
| *E21B 43/26* | (2006.01) |
| *E21B 43/22* | (2006.01) |
| *C09K 8/80* | (2006.01) |
| *C09K 8/68* | (2006.01) |
| *C09K 8/035* | (2006.01) |
| *C08K 5/31* | (2006.01) |
| *E21B 43/267* | (2006.01) |

(52) U.S. Cl.
CPC .................. *C09K 8/68* (2013.01); *C08K 5/31* (2013.01); *C09K 8/035* (2013.01); *E21B 43/26* (2013.01); *E21B 43/267* (2013.01)

(58) Field of Classification Search
CPC ........ C08L 23/20; C08L 2666/02; C08L 9/00; C09K 8/80; C09K 8/5045; C09K 8/512; C09K 8/518; C09K 8/92; E21B 43/16; E21B 43/247; E21B 43/26
See application file for complete search history.

(56) References Cited

U.S. PATENT DOCUMENTS

| | | | |
|---|---|---|---|
| 4,457,372 A | 7/1984 | Doster et al. | |
| 5,197,544 A | 3/1993 | Himes | |
| 6,232,274 B1 | 5/2001 | Hughes et al. | |
| 8,157,010 B2 | 4/2012 | Murphy et al. | |
| 2011/0315384 A1* | 12/2011 | Miquilena ............ | C09K 8/5045 166/305.1 |
| 2017/0183560 A1 | 6/2017 | McDaniel et al. | |

FOREIGN PATENT DOCUMENTS

WO    2016-018350 A1    2/2016

OTHER PUBLICATIONS

Dec. 11, 2017 PCT International Search Report and Written Opinion. Please note that the WO reference is equivalent to US20170183560.

* cited by examiner

*Primary Examiner* — Zakiya W Bates
(74) *Attorney, Agent, or Firm* — Robert W Strozier

(57) ABSTRACT

Novel fracturing fluid compositions including a polymers system including a major portion of one synthetic hydratable polymer or a plurality of synthetic hydratable polymers, and a minor portion of one natural hydratable polymer or a plurality natural hydratable polymers, and an effective amount of a viscosifying system including one guanidine salt or a plurality of guanidine salts, where the effective amount is sufficient to increase the viscosity of the synthetic polymer system by 20% or more compared to fracturing fluids including only the synthetic polymer system and methods for making and using the compositions.

20 Claims, No Drawings

HYDRAULIC FRACTURING COMPOSITIONS INCLUDING NOVEL VISCOSIFYING SYSTEMS AND METHODS FOR MAKING AND USING SAME

RELATED APPLICATIONS

This application claims priority to and the benefit of U.S. Provisional Patent Application Ser. No. 62/369,284 filed Aug. 1, 2016 (1 Aug. 2016).

BACKGROUND OF THE INVENTION

1. Field of the Invention

Embodiments of the present invention relates to hydraulic fracturing fluid compositions including a hydratable polymer system, where the effective amount is sufficient to increase the viscosity of the synthetic polymer system by 20% or more compared to fracturing fluids including only the synthetic polymer system.

Embodiments of the present invention relates to a hydraulic fracturing fluid compositions including a polymers system including a major portion of one synthetic hydratable polymer or a plurality of synthetic hydratable polymers, and a minor portion of one natural hydratable polymer or a plurality natural hydratable polymers, and an effective amount of a viscosifying system including one guanidine salt or a plurality of guanidine salts, where the effective amount is sufficient to increase the viscosity of the synthetic polymer system by 20% or more compared to fracturing fluids including only the synthetic polymer system.

2. Description of the Related Art

Historically, natural polymers have been used in the linear gel systems. These natural polymers include guar, polysaccharides such as xanthan gum, locus bean polymers, cellulose derivatives such as CMC, HEC, DHPHEC, PAC etc., where the natural polymers will not be significantly affected by the presence of high salinity carrying medium. Recently, there has been a push to replace or supplement natural polymers with synthetic polymers such as partially hydrolyzed polyacrylamides (PHPAs). See, e.g., SPE-179154-MS High Concentration Polyacrylamide-Based Friction Reducer Used as Direct Substitute for Guar-Based Borate Crosslinked Fluid in Fracturing Operations Utica and Bakken as presented by Hess in February 2016.

U.S. Pat. No. 8,841,240 discloses used similar quaternary systems in order to increase the drag reduction properties of current friction reducers including copolymers of Acrylamide-Acrylic acid with degree of hydrolysis that can go anyway between 0.1 and 50% where the drag reduction is highly improved by the addition of specific quat systems like 1-Octanaminium N,N-Dimethyl-N-Octyl-Chloride and Alkyl (C12-16). Unlike this patent, the new proposed IP will enclose total replacement Guar gum for Friction reducers based in Partially Hydrolyzed Polyacrylamides (PHPA) achieved by the addition of the quats mentioned above for viscosifying purpose.

U.S. Pat. No. 7,287,593 disclosed the use of PHPA plus amines and crosslink to improve the viscosity of the crosslinked gel systems with no mention at all of the DADAC based amines like the IP proposed and also uses concentrations higher than the those recommended per our IP.

U.S. Pat. No. 5,342,530 disclosed the use of quaternary amine based cationic polyelectrolyte and salts combined with PHPA but as temporary or permanent clay stabilizers.

U.S. Pat. No. 3,442,803 shows the use of PHPA as viscosifier when copolymerized with MBAM (Methylene Bisacrylamide).

While numerous fracturing fluids have been proposed and used, where natural polymers have been either replaced or supplemented by synthetic polymers viscosified by viscosifying agents, there is settle a need in the art for different and/or improved viscosifying systems for fracturing fluids including from about 50 wt. % to about 100 wt. % synthetic polymers.

SUMMARY OF THE INVENTION

Embodiments of the present invention related to hydraulic fracturing fluids including a base fluid, a polymers system including a major portion of one synthetic hydratable polymer or a plurality of synthetic hydratable polymers, and a minor portion of one natural hydratable polymer or a plurality natural hydratable polymers, and an effective amount of a viscosifying system including one guanidine salt or a plurality of guanidine salts, where the effective amount is sufficient to increase the viscosity of the synthetic polymer system by 20% or more compared to fracturing fluids including only the synthetic polymer system.

Embodiments of the present invention relates to polymer slurry compositions including a base fluid, a polymers system including a major portion of one synthetic hydratable polymer or a plurality of synthetic hydratable polymers, and a minor portion of one natural hydratable polymer or a plurality natural hydratable polymers, and an effective amount of a viscosifying system including one guanidine salt or a plurality of guanidine salts, where the effective amount is sufficient to increase the viscosity of a fracturing fluid including the synthetic polymer system in by 20% or more compared to fracturing fluids including only the synthetic polymer system.

Embodiments of the present invention relates to polymer compositions including a polymers system including a major portion of one synthetic hydratable polymer or a plurality of synthetic hydratable polymers, and a minor portion of one natural hydratable polymer or a plurality natural hydratable polymers, and an effective amount of a viscosifying system including one guanidine salt or a plurality of guanidine salts, where the effective amount is sufficient to increase the viscosity of a fracturing fluid including the synthetic polymer system by 20% or more compared to a fracturing fluids including only the synthetic polymer system.

Embodiments of the present invention relates to methods for fracturing a formation including pumping a fracturing fluid including a base fluid, a polymers system including a major portion of one synthetic hydratable polymer or a plurality of synthetic hydratable polymers, and a minor portion of one natural hydratable polymer or a plurality natural hydratable polymers, and an effective amount of a viscosifying system including one guanidine salt or a plurality of guanidine salts, into a formation at a pressure and for a time sufficient to fracture the formation, where the effective amount is sufficient to increase the viscosity of the fluid by 20% or more compared to fracturing fluids including only the synthetic polymer system.

DEFINITIONS OF THE INVENTION

The following terms used in this application are defined as follows:

The term "at least one" means one or more or one or a plurality, additionally, these three terms may be used interchangeably within this application. For example, at least one device means one or more devices or one device and a plurality of devices.

The term "one or a plurality" means one item, compound, agent, etc. or a plurality of item, compound, agent, etc.

The term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within ±10% of the stated value. In other embodiments, the value is within ±5% of the stated value. In other embodiments, the value is within ±2.5% of the stated value. In other embodiments, the value is within ±1% of the stated value.

The term "mixture" or "mixtures" used in the term "mixtures and combinations thereof", means a collection of materials mixed together so that the independent materials cannot be easily separated from the mixture. For example, a solution of compounds is a mixture.

The term "combination" or "combinations" used in the term "mixtures and combinations thereof", means a collection of materials combined together so that the independent materials can be easily separated from the combination. For example, a collection of red and green blocks is a combination and not a mixture in the context of mixtures and combinations.

The terms "wt. % or w/w" means percent by weight.
The term "vol. % or v/v" means percent by volume.
The term "v/w" means volume per weight.
The term "w/v" means weight per volume.
The term "gpt" means gallons per thousand gallons.
The term "ppt" means parts per thousand.
The term "gptg" means gallons per thousand gallons.
The term "pptg" means pounds per thousand gallons.
The term "wt. %" means weight percent.
The term "w/w" means weight per weight.

The term "amphoteric" refers to compounds, groups, or surfactants that have both positive and negative charges, while the net charge may be positive, negative, or neutral, depending on the pH of the solution.

The term "anionic" means a compound or group that possesses a net negative charge.

The term "cationic" means a compound or group that possesses a net positive charge.

The term "fracturing" refers to the process and methods of breaking down a geological formation, i.e. the rock formation around a well bore, by pumping fluid at very high pressures, in order to increase production rates from a hydrocarbon reservoir. The fracturing methods of this invention use otherwise conventional techniques known in the art.

The term "proppant" refers to a granular substance suspended in the fracturing fluid during the fracturing operation, which serves to keep the formation from closing back down upon itself once the pressure is released. Proppants envisioned by the present invention include, but are not limited to, conventional proppants familiar to those skilled in the art such as sand, 20-40 mesh sand, resin-coated sand, sintered bauxite, glass beads, and similar materials.

The term "surfactant" refers to a soluble, or partially soluble compound that reduces the surface tension of liquids, or reduces inter-facial tension between two liquids, or a liquid and a solid by congregating and orienting itself at these interfaces.

The term "carbyl group" is a general term meaning any group that contains at least one carbon atom and generally includes hydrocarbyl groups, perchlorinated carbyl groups, perfluorinated carbyl groups, groups including carbon and any other main group element. Carbyl group may be linear, branched, cyclic, aromatic, or include any combination thereof.

The term "hydrocarbyl group" means any group that contains at least one carbon atom bonded to at least one hydrogen atom. Hydrocarbyl group can include any other main group element and may be linear, branched, cyclic, aromatic, or include any combination thereof.

The term "major portion" means an amount greater than or equal to 50% based on weight, volume, molar, etc. In certain embodiments, "major portion" means an amount between 50.1% and 100% and any value between 50.1% and 100%.

The term "minor portion" means an amount less than or equal to 50% based on weight, volume, molar, etc. In certain embodiments, "minor portion" means an amount between 49.9% and 0% and any value between 49.9% and 0%.

DETAILED DESCRIPTION OF THE INVENTION

The inventors have found that viscosified polymer systems may be formulated that include a polymer system including a major portion of a synthetic polymer system and a minor portion of a natural polymers system and a viscosifying system including one or a plurality of hydrocarbyl substituted guanidine salts, where the effective amount is sufficient to increase the viscosity of the synthetic polymer system by 20% or more compared to fracturing fluids including only the synthetic polymer system. In certain embodiments, the viscosified polymer systems include only a synthetic polymer system. In other embodiments, the viscosifying system further includes one non-guanidine quaternary salt or a plurality of non-guanidine quaternary salts. The inventors have found that by adding a viscosifying system to slick water fracturing fluids including an aqueous base and a partially hydrolyzed polyacrylamide polymer, the viscosity properties of the fluids may be significantly increased. In certain embodiments, the effective amount is sufficient to increase the viscosity of the synthetic polymer system by 30% or more compared to fracturing fluids including only the synthetic polymer system. In certain embodiments, the effective amount is sufficient to increase the viscosity of the synthetic polymer system by 40% or more compared to fracturing fluids including only the synthetic polymer system. In certain embodiments, the effective amount is sufficient to increase the viscosity of the synthetic polymer system by 20% or more compared to fracturing fluids including only the synthetic polymer system.

Embodiments of the present invention broadly relate to methods for fracturing a formation comprising pumping a fracturing fluid composition into a formation at a pressure sufficient and for a time sufficient to fracture the formation, where the fracturing fluid composition includes a base fluid, a polymers system including a major portion of one synthetic hydratable polymer or a plurality of synthetic hydratable polymers, and a minor portion of one natural hydratable polymer or a plurality natural hydratable polymers, and an effective amount of a viscosifying system including one guanidine salt or a plurality of guanidine salts, where the effective amount is sufficient to increase the viscosity of the synthetic polymer system by 20% or more compared to fracturing fluids including only the synthetic polymer system. In certain embodiments, the guanidine salts comprises one or more compounds of guanidine salts, substituted guanidine salts, carbyl substituted guanidine salts, hydrocarbyl substituted guanidine salts, bicyclic guanidine salts, substituted bicyclic guanidine salts, carbyl substituted bicyclic guanidine salts, hydrocarbyl substituted bicyclid guanidine salts, and mixtures or combinations thereof. In other embodiments, the guanidine salts, the substituted guanidine salts, the carbyl substituted guanidine salts and the hydrocarbyl substituted guanidine salts comprise one or more compounds of Formula (I):

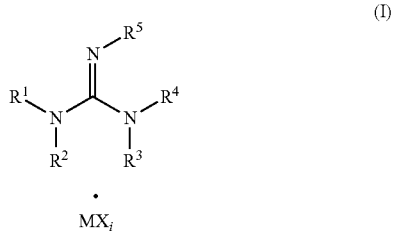

where $R^1$, $R^2$, $R^3$, $R^4$, and $R^5$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom, where M is a hydrogen ion or a metal ion, and where i is an integer between 1 and 4. In other embodiments, the guanidine salts, the substituted guanidine salts, the carbyl substituted guanidine salts and the hydrocarbyl substituted guanidine salts comprise one or more compounds of Formula (I), where (a) $R^1$ is a carbyl group, $R^{2-5}$ are hydrogen atoms, M is H, X is Cl and i is 1, (b) $R^1$ is a hydrocarbyl group, $R^{2-5}$ are hydrogen atoms, M is H, X is Cl and i is 1, (c) $R^1$ is an alkyl group having between 8 and 4 carbon atoms, $R^{2-5}$ are hydrogen atoms, M is H, X is Cl and i is 1, or (d) $R^1$ is dodecyl, $R^{2-5}$ are hydrogen atoms, M is H, X is Cl and i is 1. In certain embodiments, the bicyclic guanidine salts, substituted bicyclic guanidine salts, carbyl substituted bicyclic guanidine salts and hydrocarbyl substituted bicyclid guanidine salts comprise one or more compounds of Formula (II):

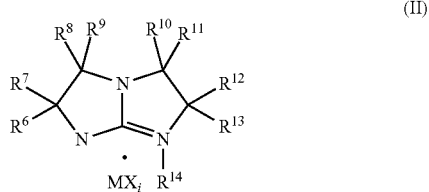

where $R^6$, $R^7$, $R^8$, $R^9$, $R^{10}$, $R^{11}$, $R^{12}$, $R^{13}$, and $R^{14}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom, where M is a hydrogen ion or a metal ion, and where i is a integer between 1 and 4. In other embodiments, the bicyclic guanidine salts, substituted bicyclic guanidine salts, carbyl substituted bicyclic guanidine salts and hydrocarbyl substituted bicyclid guanidine salts comprise one or more compounds of Formula (II), where (a) $R^6$ is a carbyl group, $R^{7-14}$ are hydrogen atoms, (b) $R^6$ is a hydrocarbyl group, $R^{7-14}$ are hydrogen atoms, M is H, X is Cl and i is 1, (c) $R^6$ is an alkyl group, $R^{7-14}$ are hydrogen atoms, M is H, X is Cl and i is 1, or (d) $R^6$ is dodecyl, $R^{7-14}$ are hydrogen atoms, M is H, X is Cl and i is 1. In certain embodiments, the viscosifying system further includes one quaternary salts or a plurality of quaternary salts. In other embodiments, the quaternary salts comprise: (1) compounds of the general formula $R^{15}R^{16}R^{17}ArN^+X^-$, where $R^{15}$, $R^{16}$, and $R^{17}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom, Ar is an aryl group, alkaaryl groups, aralkyl groups, and mixtures thereof having between 5 and 40 carbon atoms, where one or more of the carbon atoms may be replaced with an oxygen atom, a nitrogen atom, a sulfur atoms, or mixtures thereof, and $X^-$ is a counterion, (2) compounds of the general formula $R^{15}R^{16}R^{17}R^{18}N^+X^-$, where $R^{15}$, $R^{16}$, $R^{17}$ and $R^{18}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom, and $X^-$ is a counterion or (3) mixtures and combinations thereof, where $X^-$ is selected from the group chloride ($Cl^-$), bromide ($Br^-$), hydroxide ($OH^-$), sulfate ($SO_4^{2-}$), nitrate ($NO_3^-$), hydrogen sulfate ($HSO_4^-$), carbyl sulfate ($RSO_4^-$), or mixtures thereof, where R is a carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom. In certain embodiments, the partially hydrolyzed polyacrylamide polymers comprise polyacrylamide polymers having a molecular weight between about 1 million and about 50 million and being partially hydrolyzed, where the degree of hydrolysis is between about 1% to about 50%.

Embodiments of the present invention broadly relate to fracturing fluids composition comprising: a base fluid, a polymers system including a major portion of one synthetic hydratable polymer or a plurality of synthetic hydratable polymers, and a minor portion of one natural hydratable polymer or a plurality natural hydratable polymers, and an effective amount of a viscosifying system including one guanidine salt or a plurality of guanidine salts, where the effective amount is sufficient to increase the viscosity of the synthetic polymer system by 20% or more compared to fracturing fluids including only the synthetic polymer system. In certain embodiments, the guanidine salts comprises one or more compounds of guanidine salts, substituted guanidine salts, carbyl substituted guanidine salts, hydrocarbyl substituted guanidine salts, bicyclic guanidine salts, substituted bicyclic guanidine salts, carbyl substituted bicyclic guanidine salts, hydrocarbyl substituted bicyclid guanidine salts, and mixtures or combinations thereof. In other embodiments, the guanidine salts, the substituted guanidine salts, the carbyl substituted guanidine salts and the hydrocarbyl substituted guanidine salts comprise one or more compounds of Formula (I):

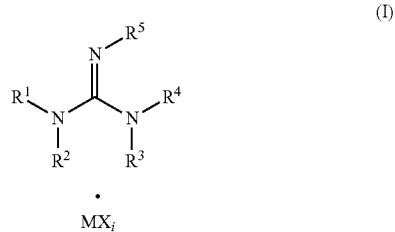

(I)

· MX$_i$ where $R^1$, $R^2$, $R^3$, $R^4$, and $R^5$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom, where M is a hydrogen ion or a metal ion, and where i is an integer between 1 and 4. In other embodiments, the guanidine salts, the substituted guanidine salts, the carbyl substituted guanidine salts and the hydrocarbyl substituted guanidine salts comprise one or more compounds of Formula (I), where (a) $R^1$ is a carbyl group, $R^{2-5}$ are hydrogen atoms, M is H, X is Cl and i is 1, (b) $R^1$ is a hydrocarbyl group, $R^{2-5}$ are hydrogen atoms, M is H, X is Cl and i is 1, (c) $R^1$ is an alkyl group having between 8 and 4 carbon atoms, $R^{2-5}$ are hydrogen atoms, M is H, X is Cl and i is 1, or (d) $R^1$ is dodecyl, $R^{2-5}$ are hydrogen atoms, M is H, X is Cl and i is 1. In certain embodiments, the bicyclic guanidine salts, substituted bicyclic guanidine salts, carbyl substituted bicyclic guanidine salts and hydrocarbyl substituted bicyclid guanidine salts comprise one or more compounds of Formula (II):

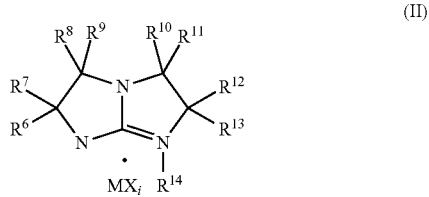

(II)

· MX$_i$ where $R^6$, $R^7$, $R^8$, $R^9$, $R^{10}$, $R^{11}$, $R^{12}$, $R^{13}$, and $R^{14}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom, where M is a hydrogen ion or a metal ion, and where i is a integer between 1 and 4. In other embodiments, the bicyclic guanidine salts, substituted bicyclic guanidine salts, carbyl substituted bicyclic guanidine salts and hydrocarbyl substituted bicyclid guanidine salts comprise one or more compounds of Formula (II), where: (a) $R^6$ is a carbyl group, $R^{7-14}$ are hydrogen atoms, (b) $R^6$ is a hydrocarbyl group, $R^{7-14}$ are hydrogen atoms, M is H, X is Cl and i is 1, (c) $R^6$ is an alkyl group, $R^{7-14}$ are hydrogen atoms, M is H, X is Cl and i is 1, or (d) $R^6$ is dodecyl, $R^{7-14}$ are hydrogen atoms, M is H, X is Cl and i is 1. In certain embodiments, the viscosifying system further includes one quaternary salts or a plurality of quaternary salts. In other embodiments, the quaternary salts comprise: (1) compounds of the general formula $R^{15}R^{16}R^{17}ArN^+X^-$, where $R^{15}$, $R^{16}$, and $R^{17}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom, Ar is an aryl group, alkaaryl groups, aralkyl groups, and mixtures thereof having between 5 and 40 carbon atoms, where one or more of the carbon atoms may be replaced with an oxygen atom, a nitrogen atom, a sulfur atoms, or mixtures thereof, and X$^-$ is a counterion, (2) compounds of the general formula $R^{15}R^{16}R^{17}R^{18}N^+X^-$, where $R^{15}$, $R^{16}$, $R^{17}$ and $R^{18}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom, and X$^-$ is a counterion or (3) mixtures and combinations thereof, where X$^-$ is selected from the group chloride (Cl$^-$), bromide (Br$^-$), hydroxide (OH$^-$), sulfate (SO$_4^{2-}$), nitrate (NO$_3^-$), hydrogen sulfate (HSO$_4^-$), carbyl sulfate (RSO$_4^-$), or mixtures thereof, where R is a carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom. In certain embodiments, the partially hydrolyzed polyacrylamide polymers comprise polyacrylamide polymers having a molecular weight between about 1 million and about 50 million and being partially hydrolyzed, where the degree of hydrolysis is between about 1% to about 50%.

Fracturing Fluids

Generally, a fracturing fluid treatment involves pumping a high viscosity fluid into a formation including a proppant, although the proppant may be pumped-in later, as a free viscous fluid, or pad, usually water with some fluid additives to generate high viscosity, into a formation at a rate faster than the fluid can escape into the formation so that the pressure rises and the rock of the formation fractures or breaks, creating artificial fractures and/or enlarging existing fractures. During or after fracturing the formation, the propping agent, generally a solid material such as sand is added to the fluid to form a slurry that is pumped into the newly formed fractures in the formation to prevent them from closing when the pumping pressure is released. The proppant transport ability of a base fluid depends on the type of viscosifying additives added to the water base.

There are various methods available for breaking a fracturing fluid or a treating fluid. Typically, fluids break after the passage of time and/or prolonged exposure to high temperatures. However, it is desirable to be able to predict and control the breaking within relatively narrow limits. Mild oxidizing agents are useful as breakers when a fluid is used in a relatively high temperature formation, although formation temperatures of 300° F. (149° C.) or higher will generally break the fluid relatively quickly without the aid of an oxidizing agent.

Examples of inorganic breaking agents for use in this invention include, but are not limited to, persulfates, percarbonates, perborates, peroxides, perphosphates, permanganates, etc. Specific examples of inorganic breaking agents include, but are not limited to, alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate, and so on. Additional suitable breaking agents are disclosed in U.S. Pat. Nos. 5,877,127; 5,649,596; 5,669,447; 5,624,886; 5,106,518; 6,162,766; and 5,807,812. In some embodiments, an inorganic breaking agent is selected from alkaline earth metal or transition metal-based oxidizing agents, such as magnesium peroxides, zinc peroxides, and calcium peroxides.

The liquid carrier can generally be any liquid carrier suitable for use in oil and gas producing wells. A presently preferred liquid carrier is water. The liquid carrier can comprise water, can consist essentially of water, or can consist of water. Water will typically be a major component by weight of the fluid. The water can be potable or non-potable water. The water can be brackish or contain other materials typical of sources of water found in or near oil fields. For example, it is possible to use fresh water, brine, or even water to which any salt, such as an alkali metal or alkali earth metal salt ($NaCO_3$, NaCl, KCl, etc.) has been added.

Suitable Reagents and Devices

Guanidine Salts

Suitable guanidine salt for use in the present invention include, without limitation, guanidine salts, substituted guanidine salts, carbyl substituted guanidine salts, hydrocarbyl substituted guanidine salts, bicyclic guanidine salts, substituted bicyclic guanidine salts, carbyl substituted bicyclic guanidine salts, hydrocarbyl substituted bicyclid guanidine salts, and mixtures or combinations thereof.

In certain embodiments, the guanidine salts, the substituted guanidine salts, the carbyl substituted guanidine salts and the hydrocarbyl substituted guanidine salts comprise one or more compounds of Formula (I):

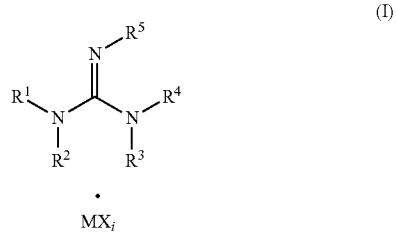

(I)

where $R^1$, $R^2$, $R^3$, $R^4$, and $R^5$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom, where M is a hydrogen ion or a metal ion, and where i is an integer between 1 and 4. In certain embodiments, $R^1$ is a carbyl group, $R^{2-5}$ are hydrogen atoms, M is H, X is Cl and i is 1. In certain embodiments, $R^1$ is a hydrocarbyl group, $R^{2-5}$ are hydrogen atoms, M is H, X is Cl and i is 1. In certain embodiments, $R^1$ is an alkyl group, $R^{2-5}$ are hydrogen atoms, M is H, X is Cl and i is 1. In other embodiments, $R^1$ is dodecyl, $R^{2-5}$ are hydrogen atoms, M is H, X is Cl and i is 1.

In certain embodiments, the bicyclic guanidine salts, the substituted bicyclic guanidine salts, the carbyl substituted bicyclic guanidine salts, and the hydrocarbyl substituted bicyclid guanidine salts comprise one or more compounds of Formula (II):

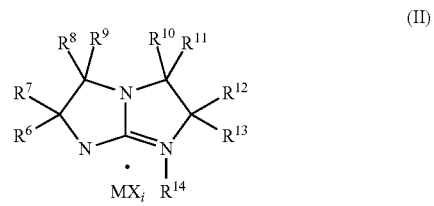

(II)

where $R^6$, $R^7$, $R^8$, $R^9$, $R^{10}$, $R^{11}$, $R^{12}$, $R^{13}$, and $R^{14}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom, where M is a hydrogen ion or a metal ion, and where i is a integer between 1 and 4. In certain embodiments, $R^6$ is a carbyl group, $R^{7-14}$ are hydrogen atoms M is H, X is Cl and i is 1. In certain embodiments, $R^6$ is a hydrocarbyl group, $R^{7-14}$ are hydrogen atoms M is H, X is Cl and i is 1. In certain embodiments, $R^6$ is an alkyl group, $R^{6-14}$ are hydrogen atoms M is H, X is Cl and i is 1. In other embodiments, $R^6$ is dodecyl, $R^{6-14}$ are hydrogen atoms, M is H, X is Cl and i is 1.

Quaternary Compounds

Suitable quaternary compounds for use in this invention include, without limitation, (1) compounds of the general formula $R^{15}R^{16}R^{17}ArN^+X^-$, where $R^{15}$, $R^{16}$, and $R^{17}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom, Ar is an aryl group, alkaaryl groups, aralkyl groups, and mixtures thereof having between 5 and 40 carbon atoms, where one or more of the carbon atoms may be replaced with an oxygen atom, a nitrogen atom, a sulfur atoms, or mixtures thereof, and $X^-$ is a counterion, (2) compounds of the general formula $R^{15}R^{16}R^{17}R^{18}N^+X^-$, where $R^{15}$, $R^{16}$, $R^{17}$ and $R^{18}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom, and $X^-$ is a counterion or (3) mixtures and combinations thereof, where $X^-$ is selected from the group chloride ($Cl^-$), bromide ($Br^-$), hydroxide ($OH^-$), sulfate ($SO_4^{2-}$), nitrate ($NO_3^-$), hydrogen sulfate ($HSO_4^-$), carbyl sulfate ($RSO_4^-$), or mixtures thereof, where R is a carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom.

In certain embodiments, the quaternary compounds for use in this invention include, without limitation, (1) compounds of the general formula $R^{15}R^{16}R^{17}ArN^+X^-$, where $R^{15}$, $R^{16}$, and $R^{17}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 6 and 40 carbon atoms, where one or more of the carbon atoms may be replace by an oxygen atom and $X^-$ is a chloride, (2) compounds of the general formula $R^{15}R^{16}R^{17}R^{18}N^+X^-$, where $R^{15}$, $R^{16}$, $R^{17}$ and $R^{18}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 6 and 40 carbon atoms, where one or more of the carbon atoms may be replace by an oxygen atom, and $X^-$ is a chloride, or (3) mixtures and combinations thereof.

Synthetic Hydratable Polymers

Suitable synthetic hydratable polymers for use in the present invention include, without limitation, (a) polyvinyl alcohol polymers and copolymers, (b) polyacrylamide polymers and copolymers, (c) poly-2-amino-2-methyl propane sulfonic acid polymers (AMPS) and copolymers, (d) polyacrylic acid polymers and copolymers, (e) polymethacrylic acid polymers and copolymers, (f) high molecular weight homo- and/or copolymers of acrylic acid crosslinked with polyalkenyl polyethers, (g) high molecular weight hydrophobically modified, cross-linked polyacrylate polymers, (h) hydrophilic, anionic, high molecular weight, cross-linked polyacrylic acid polymers, (i) for those polymers that have hydrolyzable groups, the polymers may be hydrolyzed to any desired degree, and (j) mixtures or combinations thereof.

Natural Hydratable Polymers

Suitable natural hydratable water soluble polymers for use in this invention include, without limitation, polysaccharides and mixtures or combinations thereof. Suitable polysaccharides include galactomannan gum and cellulose derivatives. In certain embodiments, the polysaccharides include guar gum, locust bean gum, carboxymethylguar, hydroxyethylguar, hydroxypropylguar, carboxymethylhydroxypropylguar, carboxymethylhydroxyethylguar, hydroxymethyl cellulose, carboxymethylhydroxyethyl cellulose, and hydroxyethyl cellulose and mixtures or combinations thereof.

The natural hydratable polymer useful in the present invention can be any of the hydratable polysaccharides having galactose or mannose monosaccharide components and are familiar to those in the well service industry. These polysaccharides are capable of gelling in the presence of a crosslinking agent to form a gelled based fluid. For instance, suitable hydratable polysaccharides are the galactomannan gums, guars and derivatized guars. Specific examples are guar gum and guar gum derivatives. Suitable gelling agents are guar gum, hydroxypropyl guar and carboxymethyl hydroxypropyl guar. In certain embodiment, the hydratable polymers for the present invention are guar gum and carboxymethyl hydroxypropyl guar and hydroxypropyl guar. Other exemplary fracturing fluid formulations are disclosed in U.S. Pat. Nos. 5,201,370 and 6,138,760, which are incorporated herein by reference. In other embodiments, the hydratable natural polysaccharides include, without limitation, guar gum, guar gum derivatives, locust bean gum, Karaya gum, carboxymethyl cellulose, carboxymethyl hydroxyethyl cellulose, hydroxyethyl cellulose, or mixtures and combinations thereof. In other embodiments, the hydratable natural polysaccharides include, without limitation, guar gums, hydroxypropyl guar, carboxymethyl hydroxypropyl guar, carboxymethyl guar, carboxymethyl hydroxyethyl cellulose, or mixtures and combinations thereof.

Proppants

The proppant type can be sand, intermediate strength ceramic proppants (available from Carbo Ceramics, Norton Proppants, etc.), sintered bauxites and other materials known to the industry. Any of these base propping agents can further be coated with a resin (available from Santrol, a Division of Fairmount Industries, Borden Chemical, etc.) to potentially improve the clustering ability of the proppant. In addition, the proppant can be coated with resin or a proppant flowback control agent such as fibers for instance can be simultaneously pumped. By selecting proppants having a contrast in one of such properties such as density, size and concentrations, different settling rates will be achieved.

Propping agents or proppants are typically added to the fracturing fluid prior to the addition of a crosslinking agent. However, proppants may be introduced in any manner which achieves the desired result. Any proppant may be used in embodiments of the invention. Examples of suitable proppants include, but are not limited to, quartz sand grains, glass and ceramic beads, walnut shell fragments, aluminum pellets, nylon pellets, and the like. Proppants are typically used in concentrations between about 1 to 8 lbs. per gallon of a fracturing fluid, although higher or lower concentrations may also be used as desired. The fracturing fluid may also contain other additives, such as surfactants, corrosion inhibitors, mutual solvents, stabilizers, paraffin inhibitors, tracers to monitor fluid flow back, and so on.

Besides the proppant concentrations in the final formulation, the particles sizes of the proppants are also a factor in the performance of the fluids of this invention. In certain embodiments, the proppants have sizes of 16/20 mesh, 16/30 mesh, 20/40 mesh and mixtures and combinations thereof. In addition, proppant density is another factor in the performance of the fluids of this invention. Exemplary examples of the proppants useful in this invention include, without limitation, CARBO-HSP® 16/30 mesh and 20/40 mesh having a bulk density=2 $g/cm^3$ and CARBO-LITE® 16/20 mesh and 20/40 mesh having a bulk density=1.57 $g/cm^3$, and mixtures or combinations thereof.

Gases

Suitable gases for foaming the fluid of this invention include, without limitation, nitrogen, carbon dioxide, or any other gas suitable for use in formation fracturing, or mixtures or combinations thereof.

Aqueous Base Fluids

Suitable aqueous base fluids includes, without limitation, seawater, freshwater, water including one or more water soluble salts such as metal chloride, metal phosphates, metal sulfates, metal, or makeup water containing up to about 30% crude oil, or mixtures thereof, where the metals are alkali metals, alkaline metals, transition metals or mixtures and combinations thereof.

Other Additives

The fracturing fluids of this invention can also include other additives as well such as scale inhibitors, carbon dioxide control additives, paraffin control additives, oxygen control additives, biocides, gel stabilizers, surfactants, clay control additives, or other additives.

Scale Control

Suitable additives for Scale Control and useful in the compositions of this invention include, without limitation: chelating agents, e.g., $Na^+$, $K^+$ or $NH_4^+$ salts of EDTA; $Na^+$, $K^+$ or $NH_4^+$ salts of NTA; $Na^+$, $K^+$ or $NH_4^+$ salts of Erythorbic acid; $Na^+$, $K^+$ or $NH_4^+$ salts of thioglycolic acid (TGA); $Na^+$, $K^+$ or $NH_4^+$ salts of Hydroxy acetic acid; $Na^+$, $K^+$ or $NH_4^+$ salts of Citric acid; Na, K or $NH_4^+$ salts of Tartaric acid or other similar salts or mixtures or combinations thereof. Suitable additives that work on threshold effects, sequestrants, include, without limitation: Phosphates, e.g., sodium hexamethylphosphate, linear phosphate salts, salts of polyphosphoric acid, Phosphonates, e.g., nonionic such as HEDP (hydroxythylidene diphosphoric acid), PBTC (phosphoisobutane, tricarboxylic acid), amino phosphonates of: MEA (monoethanolamine), $NH_3$, EDA (ethylene diamine), bishydroxyethylene diamine, bisaminoethylether, DETA (diethylenetriamine), HMDA (hexamethylene diamine), hyper homologues and isomers of HMDA, Polyamines of EDA and DETA, Diglycolamine and homologues, or similar polyamines or mixtures or combinations thereof; phosphate esters, e.g., polyphosphoric acid esters or phosphorus pentoxide ($P_2O_5$) esters of: alkanol amines such as MEA, DEA, triethanol amine (TEA), bishydroxyethylethylene diamine; ethoxylated alcohols, glycerin, glycols such as EG (ethylene glycol), propylene glycol, butylene glycol, hexylene glycol, trimethylol propane, pentaeryithrol, neopentyl glycol or the like; tris & tetra hydroxy amines; ethoxylated alkyl phenols (limited use due to toxicity problems), and ethoxylated amines such as monoamines such as MDEA and higher amines from 2 to 24 carbons atoms, diamines 2 to 24 carbons carbon atoms, or the like.

Carbon Dioxide Neutralization

Suitable additives for use in the fracturing fluids of this invention for $CO_2$ neutralization and for use in the compositions of this invention include, without limitation, MEA, DEA, isopropylamine, cyclohexylamine, morpholine, diamines, dimethylaminopropylamine (DMAPA), ethylene diamine, methoxy proplyamine (MOPA), dimethylethanol amine, methyldiethanolamine (MDEA) & oligomers, imidazolines of EDA and homologues and higher adducts, imidazolines of aminoethylethanolamine (AEEA), aminoethylpiperazine, aminoethylethanol amine, di-isopropanol amine, dialkylamines (of methyl, ethyl, isopropyl), mono alkylamines (methyl, ethyl, isopropyl), trialkyl amines (methyl, ethyl, isopropyl), bishydroxyethylethylene diamine (THEED), or the like or mixtures or combinations thereof.

Paraffin Control

Suitable additives for use in the fracturing fluids of this invention for paraffin removal, dispersion, and/or paraffin crystal distribution include, without limitation: cellosolves available from dow chemicals company; cellosolve acetates; ketones; acetate and formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methylesters of fatty acids; low molecular weight quaternary ammonium chlorides of coconut oils, soy oils or $C_{10-24}$ amines or monohalogenated alkyl and aryl chlorides; quanternary ammonium salts composed of disubstituted (e.g., dicoco, etc.) and lower molecular weight halogenated alkyl and/or aryl chlorides; gemini quaternary salts of dialkyl (methyl, ethyl, propyl, mixed, etc.) tertiary amines and dihalogenated ethanes, propanes, etc. or dihalogenated ethers such as dichloroethyl ether (DCEE), or the like; gemini quaternary salts of alkyl amines or amidopropyl amines, such as cocoamidopropyldimethyl, bis quaternary ammonium salts of DCEE; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, where the resulting surfactants have a range of HLBs. Suitable alkylphenols used in preparation of the surfactants include, without limitation, nonylphenol, decylphenol, dodecylphenol or other alkylphenols where the alkyl group has between about 4 and about 30 carbon atoms. Suitable amines used in preparation of the surfactants include, without limitation, ethylene diamine (EDA), diethylenetriamine (DETA), or other polyamines. Exemplary examples include Quadrols, Tetrols, Pentrols available from BASF. Suitable alkanolamines include, without limitation, monoethanolamine (MEA), diethanolamine (DEA), reactions products of MEA and/or DEA with coconut oils and acids.

Oxygen Control

The introduction of fracturing fluids downhole often is accompanied by an increase in the oxygen content of downhole fluids due to oxygen dissolved in the introduced water. Thus, the materials introduced downhole must work in oxygen environments or must work sufficiently well until the oxygen content has been depleted by natural reactions. For a system that cannot tolerate oxygen, then oxygen must be removed or controlled in any material introduced downhole. The problem is exacerbated during the winter when the injected materials include winterizers such as water, alcohols, glycols, Cellosolves, formates, acetates, or the like and because oxygen solubility is higher to a range of about 14-15 ppm in very cold water. Oxygen can also increase corrosion and scaling. In CCT (capillary coiled tubing) applications using dilute solutions, the injected solutions result in injecting an oxidizing environment ($O_2$) into a reducing environment ($CO_2$, $H_2S$, organic acids, etc.).

Options for controlling oxygen content includes: (1) deaeration of the fluid prior to downhole injection, (2) addition of normal sulfides to produce sulfur oxides, but such sulfur oxides can accelerate acid attack on metal surfaces, (3) addition of erythorbates, ascorbates, diethylhydroxyamine or other oxygen reactive compounds that are added to the fluid prior to downhole injection; and (4) addition of corrosion inhibitors or metal passivation agents such as potassium (alkali) salts of esters of glycols, polyhydric alcohol ethyloxylates or other similar corrosion inhibitors. Oxygen and corrosion inhibiting agents include mixtures of tetramethylene diamines, hexamethylene diamines, 1,2-diaminecyclohexane, amine heads, or reaction products of such amines with partial molar equivalents of aldehydes. Other oxygen control agents include salicylic and benzoic amides of polyamines, used especially in alkaline conditions, short chain acetylene diols or similar compounds, phosphate esters, borate glycerols, urea and thiourea salts of bisoxalidines or other compound that either absorb oxygen, react with oxygen or otherwise reduce or eliminate oxygen.

Salt Inhibitors

Suitable salt inhibitors for use in the fluids of this invention include, without limitation, Na Minus-Nitrilotriacetamide available from Clearwater International, LLC of Houston, Tex.

Experiments of the Invention

Viscosity and Power Law Parameters in HPHT Viscosmeter @ 400-500 psi at 150° F. and 250° F.

| Shear Rate (1/s) | Viscosity (cP) Temperature (150° F.) | | Viscosity (cP) Temperature (250° F.) | |
|---|---|---|---|---|
| | KFR-21 (3.0 gpt) | KFR-21 (3.0 gpt) + 50 mg/L (50 ppm) G1 | KFR-21 (3.0 gpt) | KFR-21 (3.0 gpt) + 50 mg/L (50 ppm) G1 |
| 511 | 9.74 | 14.73 | 7.04 | 9.47 |
| 340 | 13.79 | 20.23 | 10.29 | 13.5 |
| 170 | 23.49 | 30.8 | 18.94 | 23.78 |
| 102 | 35.28 | 41.58 | 28.99 | 34.8 |
| 51.1 | 58.83 | 65.59 | 50.13 | 55.93 |
| 34 | 88.41 | 97.13 | 71.7 | 81.15 |
| 17 | 150.67 | 162.3 | 118.71 | 136.14 |
| 10.2 | 247.09 | 265.65 | 189.78 | 217.22 |
| 5.11 | 452.93 | 481.93 | 330.36 | 394.92 |
| 3.4 | 666.19 | 719.18 | 473.66 | 568.76 |
| 1.7 | 1216.16 | 1327.26 | 860.27 | 1041.81 |
| n' | 0.16 | 0.21 | 0.17 | 0.19 |
| K'lb/100 ft$^2$ | 3.72 | 3.59 | 2.74 | 3.11 |

KFR-21 is a slurry of Partially Hydrolyzed Polyacrylamide (PHPA)
G1 is dodecyl-guanidine monohydrochloride All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for fracturing a formation comprising:
   pumping a fracturing fluid composition into a formation at a pressure sufficient and for a time sufficient to fracture the formation,
   wherein the fracturing fluid composition comprises:
   a base fluid,
   a polymer system including:
     a major portion of one partially hydrolyzed polyacrylamide polymer or a plurality of partially hydrolyzed polyacrylamide polymers, and
     a minor portion of one natural hydratable polymer or a plurality natural hydratable polymers, and
   an effective amount of a viscosifying system including one guanidine salt or a plurality of guanidine salts,
   wherein the major portion is an amount greater than or equal to 50 wt. % and the minor portion is an amount less than or equal to 50 wt. %, and
   wherein the effective amount is sufficient to increase the viscosity of the synthetic polymer system by 20% or more compared to fracturing fluids including only the polymer system.

2. The method of claim 1, wherein the guanidine salts comprises one or more compounds selected from the group consisting of guanidine salts, substituted guanidine salts, carbyl substituted guanidine salts, hydrocarbyl substituted guanidine salts, bicyclic guanidine salts, substituted bicyclic guanidine salts, carbyl substituted bicyclic guanidine salts, hydrocarbyl substituted bicyclic guanidine salts, and mixtures or combinations thereof.

3. The method of claim 2, wherein the guanidine salts, the substituted guanidine salts, the carbyl substituted guanidine salts, and the hydrocarbyl substituted guanidine salts comprise one or more compounds of Formula (I):

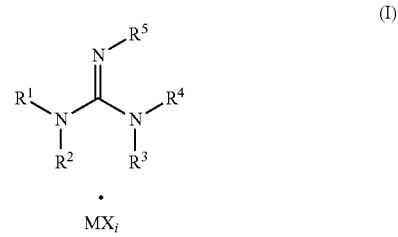

wherein:
   $R^1$, $R^2$, $R^3$, $R^4$, and $R^5$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom,
   M is a hydrogen ion or a metal ion,
   X is selected from the group chloride (Cl$^-$), bromide (Br$^-$), hydroxide (OH$^-$), sulfate (SO$_4^{-2}$), nitrate (NO$_3^-$), hydrogen sulfate (HSO$_4^-$), carbyl sulfate (RSO$_4^-$), or mixtures thereof, wherein R is a carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, and
   i is an integer between 1 and 4.

4. The method of claim 3, wherein
   (a) $R^1$ is a carbyl group, $R^{2-5}$ are hydrogen atoms, M is H, X is Cl, and i is 1,
   (b) $R^1$ is a hydrocarbyl group, $R^{2-5}$ are hydrogen atoms, M is H, X is Cl, and i is 1,
   (c) $R^1$ is an alkyl group having between 8 and 4 carbon atoms, $R^{2-5}$ are hydrogen atoms, M is H, X is Cl, and i is 1, or
   (d) $R^1$ is dodecyl, $R^{2-5}$ are hydrogen atoms, M is H, X is Cl, and i is 1.

5. The method of claim 2, wherein the bicyclic guanidine salts, substituted bicyclic guanidine salts, carbyl substituted bicyclic guanidine salts and hydrocarbyl substituted bicyclic guanidine salts comprise one or more compounds of Formula (II):

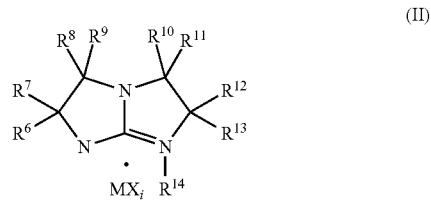

wherein:
   $R^6$, $R^7$, $R^8$, $R^9$, $R^{10}$, $R^{11}$, $R^{12}$, $R^{13}$, and $R^{14}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, M is a hydrogen ion or a metal ion, X is selected from the group chloride (Cl$^-$), bromide (Br$^-$), hydroxide (OH$^-$), sulfate (SO$_4^{-2}$), nitrate (NO$_3^-$), hydrogen sulfate (HSO$_4^-$), carbyl sulfate (RSO$_4^-$), or mixtures thereof, wherein R is a carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, and i is a integer between 1 and 4.

6. The method of claim 5, wherein
(a) R$^6$ is a carbyl group, R$^{7-14}$ are hydrogen atoms, M is H, X is Cl, and i is 1,
(b) R$^6$ is a hydrocarbyl group, R$^{7-14}$ are hydrogen atoms, M is H, X is Cl, and i is 1,
(c) R$^6$ is an alkyl group, R$^{7-14}$ are hydrogen atoms, M is H, X is Cl, and i is 1, or
(d) R$^6$ is dodecyl, R$^{7-14}$ are hydrogen atoms, M is H, X is Cl, and i is 1.

7. The method of claim 1, wherein the viscosifying system further includes one quaternary salts or a plurality of quaternary salts.

8. The method of claim 7, wherein the quaternary salts comprise:
(1) compounds of the general formula

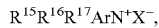

wherein:
R$^{15}$, R$^{16}$, and R$^{17}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, Ar is an aryl group, alkaaryl groups, aralkyl groups, and mixtures thereof having between 5 and 40 carbon atoms, where one or more of the carbon atoms may be replaced with an oxygen atom, a nitrogen atom, a sulfur atoms, or mixtures thereof, and X$^-$ is a counterion, (2) compounds of the general formula

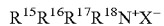

wherein:
R$^{15}$, R$^{16}$, R$^{17}$ and R$^{18}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, and X$^-$ is a counterion, or (3) mixtures and combinations thereof, wherein X$^-$ is selected from the group chloride (Cl$^-$), bromide (Br$^-$), hydroxide (OH$^-$), sulfate (SO$_4^{2-}$), nitrate (NO$_3^-$), hydrogen sulfate (HSO$_4^-$), carbyl sulfate (RSO$_4^-$), or mixtures thereof, wherein R is a carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom.

9. The method of claim 1, wherein the partially hydrolyzed polyacrylamide polymers comprise polyacrylamide polymers having a molecular weight between about 1 million and about 50 million and being partially hydrolyzed, wherein a degree of hydrolysis is between about 1% to about 50%.

10. A fracturing fluid composition comprising:
a base fluid,
a polymers system including:
a major portion of one partially hydrolyzed polyacrylamide polymer or a plurality of partially hydrolyzed polyacrylamide polymers, and
a minor portion of one natural hydratable polymer or a plurality natural hydratable polymers, and
an effective amount of a viscosifying system including one guanidine salt or a plurality of guanidine salts,
wherein the major portion is an amount greater than or equal to 50 wt. % and the minor portion is an amount less than or equal to 50 wt. %, and
wherein the effective amount is sufficient to increase the viscosity of the synthetic polymer system by 20% or more compared to fracturing fluids including only the synthetic polymer system.

11. The method of claim 1, wherein:
the major portion is an amount between 50.1 wt. % and 100 wt. % and any value between 50.1 wt. % and 100 wt. %, and
the minor portion is an amount between 49.9 wt. % and 0 wt. % and any value between 49.9 wt. % and 0 wt. %.

12. The composition of claim 10, wherein the guanidine salts comprise one or more compounds selected from the group consisting of guanidine salts, substituted guanidine salts, carbyl substituted guanidine salts, hydrocarbyl substituted guanidine salts, bicyclic guanidine salts, substituted bicyclic guanidine salts, carbyl substituted bicyclic guanidine salts, hydrocarbyl substituted bicyclic guanidine salts, and mixtures or combinations thereof.

13. The composition of claim 12, wherein the guanidine salts, the substituted guanidine salts, the carbyl substituted guanidine salts and the hydrocarbyl substituted guanidine salts comprise one or more compounds of Formula (I):

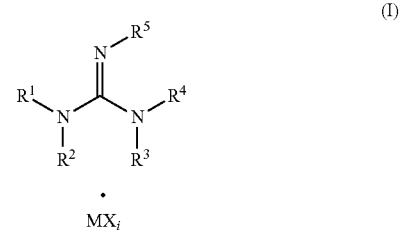

wherein:
R$^1$, R$^2$, R$^3$, R$^4$, and R$^5$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, where one or more of the carbon atoms may be replace by an oxygen atom, M is a hydrogen ion or a metal ion, X is selected from the group chloride (Cl$^-$), bromide (Br$^-$), hydroxide (OH$^-$), sulfate (SO$_4^{-2}$), nitrate (NO$_3^-$), hydrogen sulfate (HSO$_4^-$), carbyl sulfate (RSO$_4^-$), or mixtures thereof, wherein R is a carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, and i is an integer between 1 and 4.

14. The composition of claim 13, wherein:
(a) $R^1$ is a carbyl group, $R^{2-5}$ are hydrogen atoms, M is H, X is Cl, and i is 1,
(b) $R^1$ is a hydrocarbyl group, $R^{2-5}$ are hydrogen atoms, M is H, X is Cl, and i is 1,
(c) $R^1$ is an alkyl group having between 8 and 4 carbon atoms, $R^{2-5}$ are hydrogen atoms, M is H, X is Cl, and i is 1, or
(d) $R^1$ is dodecyl, $R^{2-5}$ are hydrogen atoms, M is H, X is Cl and i is 1.

15. The composition of claim 14, wherein the bicyclic guanidine salts, substituted bicyclic guanidine salts, carbyl substituted bicyclic guanidine salts and hydrocarbyl substituted bicyclic guanidine salts comprise one or more compounds of Formula (II):

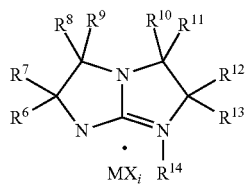

(II)

wherein:
$R^6$, $R^7$, $R^8$, $R^9$, $R^{10}$, $R^{11}$, $R^{12}$, $R^{13}$, and $R^{14}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, M is a hydrogen ion or a metal ion,
X is selected from the group chloride ($Cl^-$), bromide ($Br^-$), hydroxide ($OH^-$), sulfate ($SO_4^{-2}$), nitrate ($NO_3^-$), hydrogen sulfate ($HSO_4^-$), carbyl sulfate ($RSO_4^-$), or mixtures thereof, wherein R is a carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, and i is a integer between 1 and 4.

16. The composition of claim 15, wherein:
(a) $R^6$ is a carbyl group, $R^{7-14}$ are hydrogen atoms, M is H, X is Cl, and i is 1,
(b) $R^6$ is a hydrocarbyl group, $R^{7-14}$ are hydrogen atoms, M is H, X is Cl, and i is 1,
(c) $R^6$ is an alkyl group, $R^{7-14}$ are hydrogen atoms, M is H, X is Cl, and i is 1, or
(d) $R^6$ is dodecyl, $R^{7-14}$ are hydrogen atoms, M is H, X is Cl, and i is 1.

17. The composition of claim 10, wherein the viscosifying system further includes one quaternary salts or a plurality of quaternary salts.

18. The composition of claim 17, wherein the quaternary salts comprise:
(1) compounds of the general formula $R^{15}R^{16}R^{17}ArN^+X^-$ wherein:
$R^{15}$, $R^{16}$, and $R^{17}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, Ar is an aryl group, alkaaryl groups, aralkyl groups, and mixtures thereof having between 5 and 40 carbon atoms, wherein one or more of the carbon atoms may be replaced with an oxygen atom, a nitrogen atom, a sulfur atoms, or mixtures thereof, and $X^-$ is a counterion, (2) compounds of the general formula $R^{15}R^{16}R^{17}R^{18}N^+X^-$ wherein:
$R^{15}$, $R^{16}$, $R^{17}$ and $R^{18}$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, and $X^-$ is a counterion, or (3) mixtures and combinations thereof,
wherein $X^-$ is selected from the group chloride ($Cl^-$), bromide ($Br^-$), hydroxide ($OH^-$), sulfate ($SO_4^{2-}$), nitrate ($NO_3^-$), hydrogen sulfate ($HSO_4^-$), carbyl sulfate ($RSO_4^-$), or mixtures thereof, wherein R is a carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom.

19. The composition of claim 10, wherein the partially hydrolyzed polyacrylamide polymers comprise polyacrylamide polymers having a molecular weight between about 1 million and about 50 million and being partially hydrolyzed, and wherein a degree of hydrolysis is between about 1% to about 50%.

20. The composition of claim 10, wherein:
the major portion is an amount between 50.1 wt. % and 100 wt. % and any value between 50.1 wt. % and 100 wt. %, and
the minor portion is an amount between 49.9 wt. % and 0 wt. % and any value between 49.9 wt. % and 0 wt. %.

* * * * *